(12) United States Patent
Viella Fernandez et al.

(10) Patent No.: US 10,075,610 B2
(45) Date of Patent: Sep. 11, 2018

(54) PROVIDING PRINT DIMENSIONS FROM A PRINTER

(71) Applicant: HEWLETT-PACKARD DEVELOPMENT COMPANY, L.P., Houston, TX (US)

(72) Inventors: Francisco Javier Viella Fernandez, San Cugat del Valles (ES); Sebastia Castelltort Amoros, Igualada (ES); Alessia Rullo, Sant Cugat del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/306,700

(22) PCT Filed: Apr. 30, 2014

(86) PCT No.: PCT/US2014/036220
§ 371 (c)(1),
(2) Date: Oct. 25, 2016

(87) PCT Pub. No.: WO2015/167550
PCT Pub. Date: Nov. 5, 2015

(65) Prior Publication Data
US 2017/0048411 A1    Feb. 16, 2017

(51) Int. Cl.
*H04N 1/23* (2006.01)
*G06F 3/12* (2006.01)
(Continued)

(52) U.S. Cl.
CPC ......... *H04N 1/2323* (2013.01); *G06F 3/1208* (2013.01); *G06F 3/1232* (2013.01);
(Continued)

(58) Field of Classification Search
USPC ........................................................ 358/1.15
See application file for complete search history.

(56) References Cited

U.S. PATENT DOCUMENTS 5,890,708 A    4/1999  Song
8,373,888 B2   2/2013  Myagi et al.
(Continued)

FOREIGN PATENT DOCUMENTS

EP    1696337    8/2006

OTHER PUBLICATIONS

LX400 Color Label Printer, Oct. 18, 2013, User's Manual, 56 pages, http://www.primeralabel.com/support/Docs/LX400Manual510984_101813linked.pdf.

*Primary Examiner* — Ngon Nguyen
(74) *Attorney, Agent, or Firm* — HP Inc. Patent Department (57) ABSTRACT

Methods, apparatus, systems and articles of manufacture are disclosed for providing print dimensions from a printer. An example method includes analyzing a first roll of a printer, the first roll holding first paper having a first width; determining, via a processor of the printer, a first print dimension of the first paper on the first roll based on the first width; and providing the first print dimension to an electronic device, the electronic device to use the first print dimension to determine whether content is to be clipped when printed on the first paper.

15 Claims, 8 Drawing Sheets

(51) Int. Cl.
  *G06K 15/02* (2006.01)
  *G06K 15/00* (2006.01)
  *H04N 1/00* (2006.01)

(52) U.S. Cl.
  CPC .......... *G06F 3/1254* (2013.01); *G06F 3/1285* (2013.01); *G06K 15/022* (2013.01); *G06K 15/4065* (2013.01); *H04N 1/00039* (2013.01); *H04N 1/00068* (2013.01); *H04N 1/00082* (2013.01); *H04N 1/00092* (2013.01); *H04N 1/2384* (2013.01)

(56) References Cited

U.S. PATENT DOCUMENTS

| | | |
|---|---|---|
| 8,451,489 B1 | 5/2013 | Arora et al. |
| 2007/0201922 A1 | 8/2007 | Takailashi |
| 2007/0273895 A1 | 11/2007 | Cudd et al. |
| 2007/0296748 A1 | 12/2007 | Oki |
| 2009/0009820 A1* | 1/2009 | Fukui ................... H04N 1/3875 358/449 |
| 2010/0060908 A1 | 3/2010 | Kurata |
| 2012/0036427 A1* | 2/2012 | Osaka ................... G06F 17/211 715/243 |
| 2012/0204087 A1* | 8/2012 | Yamada .............. G06F 17/2235 715/205 |

* cited by examiner

FIG. 8

PROVIDING PRINT DIMENSIONS FROM A PRINTER

BACKGROUND

Printers are a part of everyday life as users print materials documents, images, labels, etc.) for personal and/or business uses. There are several different types of printers and/or paper/media to satisfy various purposes. Furthermore, many applications, drivers, etc. on computers and/or other user devices facilitate a user interface for printing documents, images, etc.

In many instances characteristics of a type of print medium (e.g., paper, cardboard, etc.) and/or a printer may limit and/or restrict a printer from printing desired content (i.e., the content is clipped from the print media). For example, a printer may not be able to print within a particular distance from an edge of a particular paper type due to the possibility of paper jams (e.g., from the paper curling at the edges), ink related issues (e.g., overspray), etc. Furthermore, unique characteristics of a certain printer may contribute to the printer's ability or inability to print content.

Printers are capable of connecting with a variety of electronic devices from which users can make printing requests to the printer. Printers may be registered with particular electronic devices (or vice versa) such that settings for the printer are stored on the electronic device. In some instances, a printer may be accessed by an electronic that is not registered to the electronic device or vice versa.

DETAILED DESCRIPTION

Users create content (print media) that is to be printed using software and/or applications on an electronic device. Print drivers facilitate print setup for printers in communication with the electronic device. Accordingly, the print drivers control the settings for printing the content. However, in many instances print drivers and/or applications use fixed settings for printing. Accordingly, content may be clipped due to the application and/or driver settings despite the ability of the printer being able to print the clipped content. Examples disclosed herein involve receiving printer specifications, information, and characteristics directly from the printer to allow for increase printing accuracy. Examples disclosed herein involve using received printer specifications and information for selecting an appropriate paper roll or tray that for printing. Examples disclosed herein involve generating print previews for printing content based on the information received from the printer.

Examples disclosed herein involve analyzing a roll holding paper, determining a print dimension of the paper based on a width of the paper, and providing the print dimension to an electronic device, the electronic device to use the first print dimension to determine whether content is to be clipped when printed on the paper. An example apparatus includes a roll manager, a dimension analyzer, and a dimension provider, that provide printer characteristics and information to an electronic device. Examples herein involve analyzing a print area of a paper on a roll of a printer, the print area received from the printer, comparing the print area to a content area, the content area determined based on content to be printed on the first paper by the printer, and determining whether a first portion of the content is to be clipped when printed on the first paper based on the compared print area and the content area.

As used herein, a print medium or print media is(are) any instrument to which a printer may print (e.g., apply ink to), such as, for example, paper, card stock, cardboard, photo paper, cloth, wood, metal, plastic, etc. As used herein, media refers to any document, image, object, label, etc. that is to be printed onto a print medium by a printer. As used herein, a paper roll refers to a mechanism (e.g., a roller) of a printer that is used to hold and/or feed paper into the printer for printing. Similarly, as used herein, a paper tray is a mechanism for storing sheets of paper. As used herein, a roll or tray may be used interchangeably to refer to paper loading mechanisms, paper supplying sources, and/or paper storage instruments. As used herein, non-print margins refer to areas (e.g., borders) of a print medium to which a printer cannot apply ink or any other printing substance (e.g., due to paper curling, due to overspray, etc). As used herein, length, width, height, depth, etc. refer to dimensions of a print medium.

Figure 1:
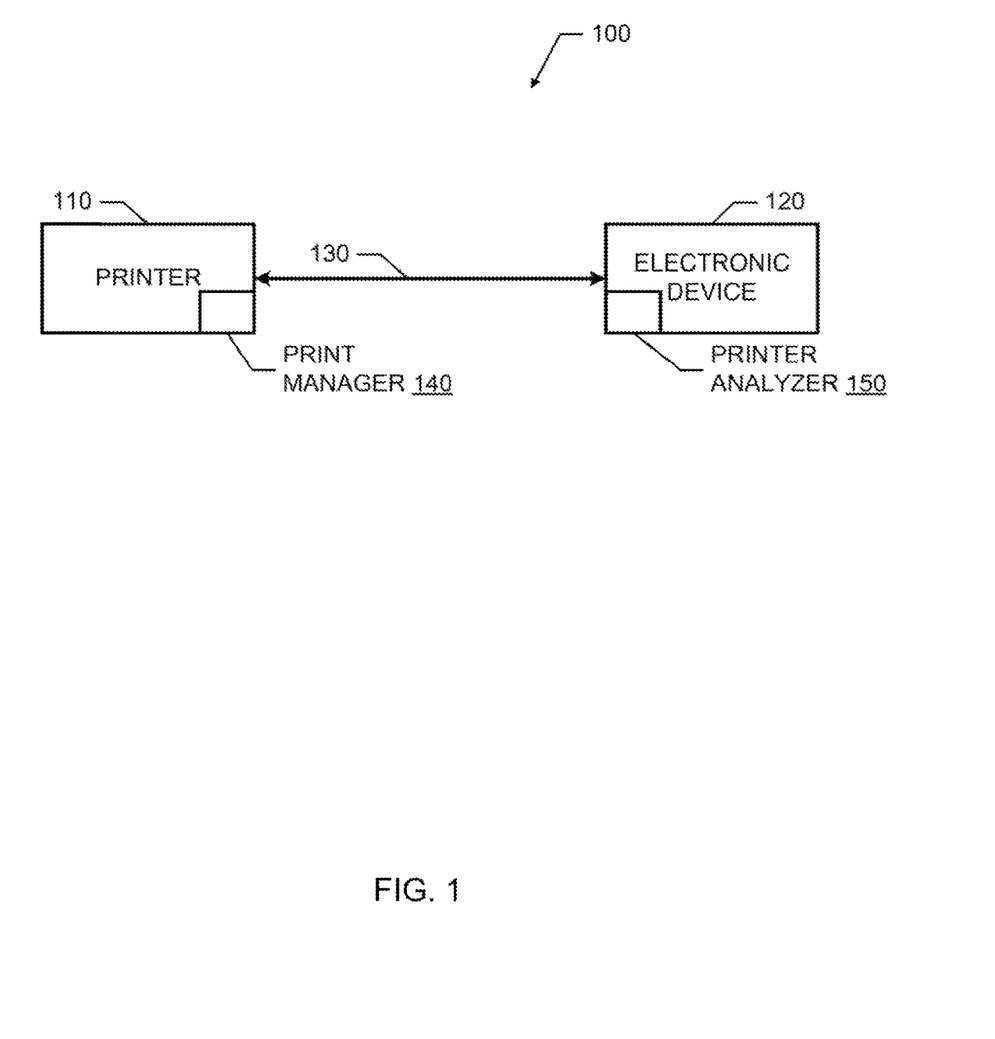
FIG. 1 illustrates an example printing system including an example print manager and printer analyzer constructed in accordance with the teachings of this disclosure.

FIG. 1 illustrates an example printing system 100 including a printer 110 and an electronic device 120. The example printer 110 is in communication with the electronic device 120 via a communication link 130. The example communication link may be a wired connection (e.g., universal serial bus (USB), Ethernet, parallel connection, serial connection, etc.) and/or a wireless connection (e.g., Wifi, Bluetooth®, etc.). In some examples, the communication link 130 includes a network (e.g., a local area network (LAN), wide area network (WAN), intranet, the Internet, etc.).

In the illustrated example, the electronic device 120 sends data to the printer 110 corresponding to media (e.g., documents, images, etc.) that is/are to be printed on a print medium (e.g., paper, card stock, cardboard, etc.). In response to receiving instructions to print the media on the print medium, the printer 110 applies ink (or other similar printing material) to a designated print medium. In some examples, the electronic device 120 selects a print medium (e.g., a particular paper type, paper size, etc.) loaded into the printer 110 to which the media is to be printed.

The printer 110 of FIG. 1 includes at least one roll and/or tray to store and/or supply a print medium for the printer 110. The example roll and/or tray may be implemented by any print medium storage mechanism, such as a cylindrical roller, to store a paper roll, a surface to store paper, etc. Accordingly, using any suitable techniques, any print media may be stored and/or supplied to the printer 110.

In the illustrated example of FIG. 1, the printer 110 includes a print manager 140 constructed in accordance with the teachings of this disclosure and the electronic device 120 includes a printer analyzer 150 constructed in accordance with the teachings of this disclosure. The example print manager 140, as disclosed herein, analyzes and/or manages the printer 110 and provides the electronic device 120 with information and/or specifications of the printer 110. An example of the print manager 140 of FIG. 1 is discussed in further detail below in connection with FIG. 2.

The printer analyzer 150 receives and analyzes information from the printer 110 and/or print manager 140. In some examples, the printer analyzer 150 uses the information to determine or select a paper type, a paper size, and/or paper source for printing media. In some examples, the printer analyzer 150 facilitates a print preview by comparing media (or content to be printed) with received printer information or received printer specifications from the print manager 140 of the printer 110. Accordingly, as disclosed herein, the example printer analyzer 150 uses information received from the print manager 140 and/or printer 110 to facilitate printing, print analysis, and/or print previewing.

Figure 2:
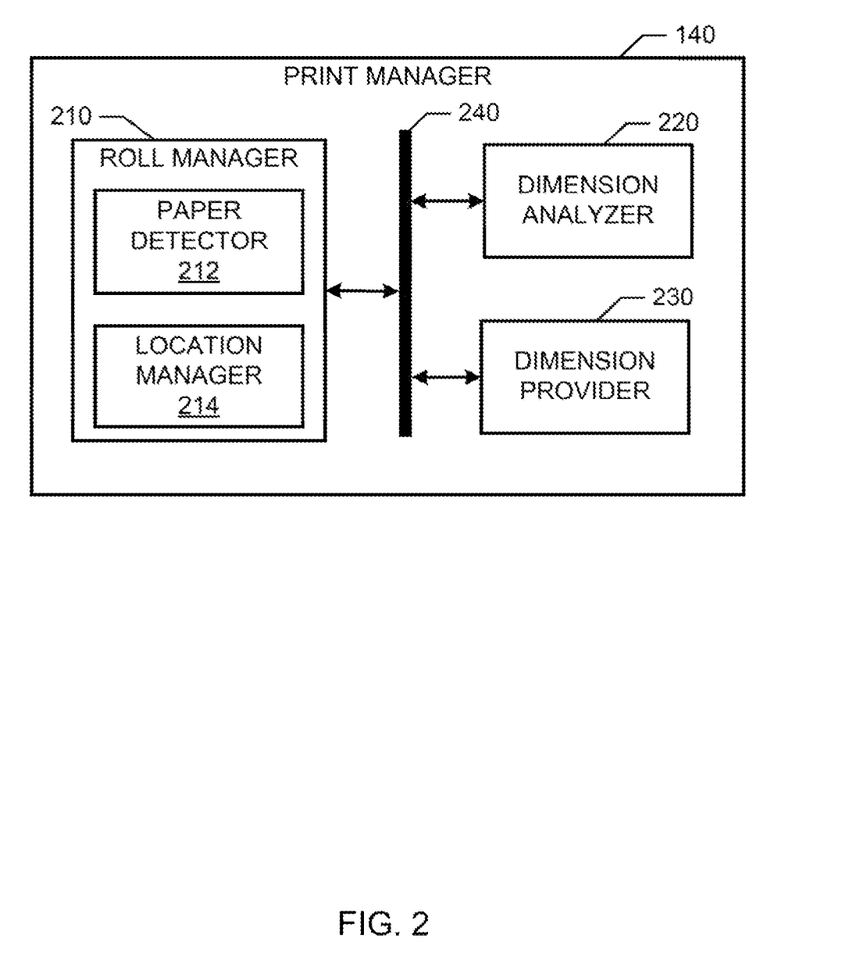
FIG. 2 is a block diagram of an example print manager that may be used to implement the printer manager of FIG. 1.

FIG. 2 is a block diagram of an example print manager 140. The print manager 140 of FIG. 2 may be used to implement the print manager 140 of FIG. 1. The print manager 140, as disclosed herein, monitors and/or analyzes the printer 110 and provides corresponding information to the printer 120 and/or printer analyzer 150 of FIG. 1. The print manager 140 in the illustrated example of FIG. 1 includes a roll manager 210 having a paper detector 212 and a location manager 214. The print manager 140 of FIG. 1 also includes a dimension analyzer 220 and a dimension provider 230. In the illustrated example of FIG. 2, the roll manager 210, the dimension analyzer 220, and the dimension provider 230 communicate via a communication bus 240.

The roll manager 210 of FIG. 2 monitors roll(s) and/or tray(s) of the printer 110. The example roll manager 210 of FIG. 2 includes a paper detector 212 and a location manager 214. The roll manager 210 identifies and/or analyzes roll(s) and/or tray(s) of the printer 110. For example, the roll manager 210 may receive data and/or information from sensors and/or roll/tray detectors of the printer 110. In such an example, the roll manager 210 may detect and/or determine the mechanisms that control the printer 210 (e.g., any electronics that control the mechanical printing components of the printer 110). In some examples, such information is provided to the roll manager 210 via default settings for the printer 110 and user settings/input.

The roll manager 210 of the illustrated example of FIG. 2 includes an example paper detector 212 to detect the presence (or lack thereof) of a print medium on a corresponding roll and/or tray. The example paper detector 212 may be implemented by at least one of a sensor and/or scanner capable of identifying paper and/or any other print medium. For example, the paper detector 212 may identify paper (and/or any other print medium) on a roll and/or within a tray of the printer 110 based on a contrast between the paper and other physical parts (e.g., the housing, mechanical parts, etc.) of the printer 110. In some examples, the paper detector 212 may measure a volume of a print medium on a roll or in a tray (e.g., based on a circumference/diameter of a print medium in a roll, based on a thickness of a print medium in a tray, based on paper type, etc.).

The location manager 214 of the roll manager 210 in the illustrated example of FIG. 2 determines a location of a print medium relative to a physical roll and/or physical tray. For example, a roll of paper may be loaded onto a paper roll of the printer 110. In such an example the roll of paper may be centered on the roll and/or positioned to either side of center on the roll. Accordingly, the location manager 214 may identify/determine the location of the print medium relative to the roll and/or tray of the printer 110. In some examples, the location manager 214 may control and/or adjust a position of a print medium relative to a roll position and/or a tray position. For example, the location manager 214 may instruct a mechanism of the printer 110 to position a print medium at a center and/or at a different axial location of a roll of the printer 110.

In the illustrated example of FIG. 2, the print manager 140 includes an example dimension analyzer 220. The dimension analyzer 220 analyzes the print medium/media of the identified roll(s)/tray(s) of the printer 110. For example, the dimension analyzer 220 determines a length, width, height (depth), etc. of a print medium in roll(s)/tray(s) of the printer 110. In some examples, the dimension analyzer 220 may determine characteristics of the print medium, such as substance (paper, cardboard, wood, metal, plastic, etc.), type (e.g., matte, gloss, shine, etc.), quality, thickness, strength, etc. Based on the determined characteristics of the analyzed print medium (e.g., the dimensions, content, type, quality, etc.), the dimension analyzer 220 of FIG. 2 determines print dimensions for the analyzed print medium/roll of the printer 110. As an example, the dimension analyzer 220 may determine that a first type of paper (e.g., document paper) has a first print dimension while a second type of paper (e.g., photo paper) has a second dimension. In some examples, the dimension analyzer 220 determines non-print margins of a print medium stored and/or loaded in the printer 110. For example, the dimension analyzer 220 may identify/determine areas of a print medium to which the printer 110 cannot apply ink (or any other suitable print substance) that would provide a relatively accurate result of the media that is to be printed. Accordingly, the dimension analyzer 220 of the illustrated example of FIG. 2 analyzes and/or determines characteristics of the print medium stored/loaded in the printer 110. The dimension analyzer 220 of FIG. 2 forward such characteristics to the dimension provider 230.

The dimension provider 230 of FIG. 2 facilitates communication with the electronic device 120 of FIG. 1. The dimension provider 230 of FIG. 2 provides information determined by the dimension analyzer 220 to the electronics device 120 of FIG. 1. For example, the dimension provider 230 forwards characteristics of the roll(s)/tray(s) of the printer 110 and/or characteristics of the print media of the roll(s)/tray(s) of the printer 110 received from the dimension analyzer 220. Accordingly, the dimension provider 230 serves as an interface between the printer 110 and the electronics device 120. In some examples, the dimension provider 230 may identify the printer analyzer 150 upon connection with the electronic device 120 via the communication link 130. For example, a "plug and play" connection may occur when the electronic device 120 communicatively connects with the printer 110. In such an example, the print manager 140 and the printer analyzer 150 may share information corresponding to the printer 110 and the electronic device 120, respectively.

While an example manner of implementing the print manager 140 FIG. 1 is illustrated in FIG. 2, at least one of the elements, processes and/or devices illustrated in FIG. 2 may be combined, divided, re-arranged, omitted, eliminated and/or implemented in any other way. Further the roll manager 210, including the paper detector 212 and the location manager 214, the dimension analyzer 220, the dimension provider 230 and/or, more generally, the example print manager 140 of FIG. 2 may be implemented by hardware, software, firmware and/or any combination of hardware, software and/or firmware. Thus, for example, any of the roll manager 210, including the paper detector 212 and the location manager 214, the dimension analyzer 220, the dimension provider 230 and/or, more generally, the example print manager 140 could be implemented by at least one analog or digital circuit, logic circuit, programmable processor, application specific integrated circuit (ASIC), programmable logic device (PLD) and/or field programmable logic device (FPLD). When reading any of the apparatus or system claims of this patent to cover a purely software and/or firmware implementation, at least one of the roll manager 210, including the paper detector 212 and the location manager 214, the dimension analyzer 220, and/or the dimension provider 230 is/are hereby expressly defined to include a tangible computer readable storage device or storage disk such as a memory, a digital versatile disk (DVD), a compact disk (CD), a Blu-ray disk, etc. storing the software and/or firmware. Further still, the example print manager 140 of FIG. 2 may include at least one element, process and/or device in addition to, or instead of, those illustrated in FIG. 1, and/or may include more than one of any or all of the illustrated elements, processes and devices.

Figure 3:
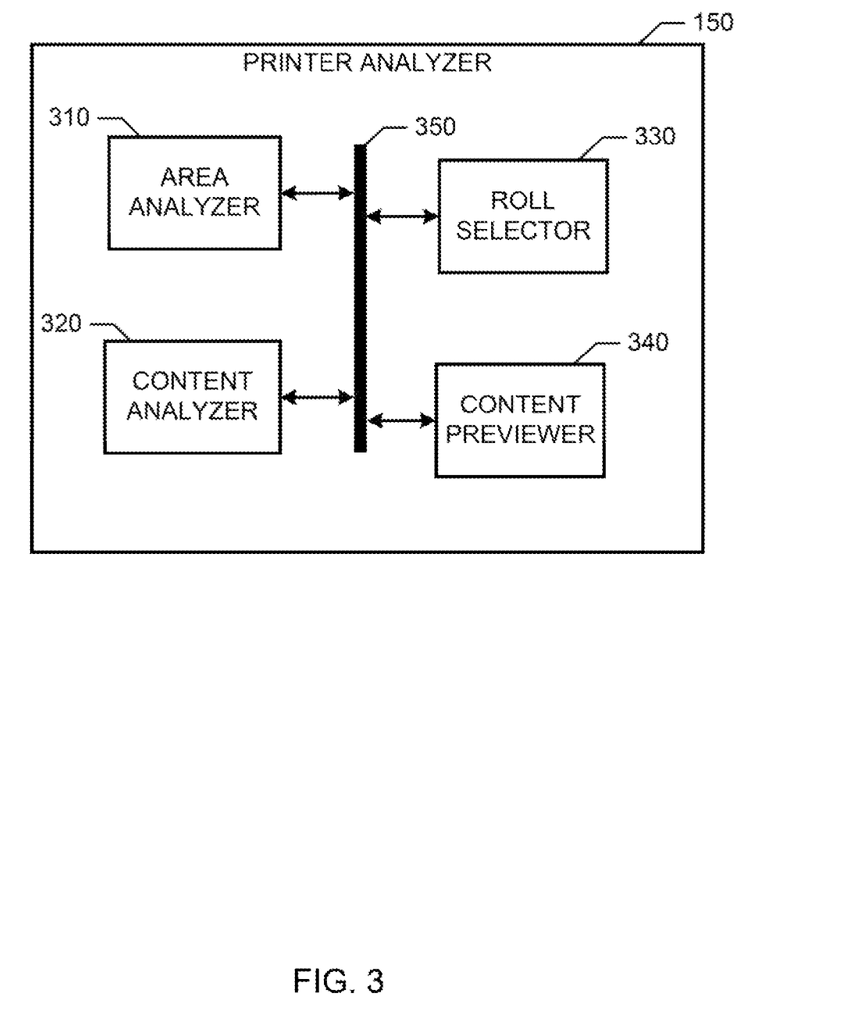
FIG. 3 is a block diagram of an example printer analyzer that may be used to implement the printer analyzer of FIG. 1.

FIG. 3 is a block diagram of an example printer analyzer 150. The printer analyzer 150 of FIG. 3 may be used to implement the printer analyzer 150 of FIG. 1. The printer analyzer 150, as disclosed herein, receives and/or analyzes data from the printer 110 and/or print manager 140 of FIGS. 1 and/or 2. The printer analyzer 150 in the illustrated example of FIG. 3 includes an area analyzer 310, a content analyzer 320, a roll selector 330, and a content previewer 340. In the illustrated example of FIG. 3, the area analyzer 310, the content analyzer 320, the roll selector 330, and/or the content previewer 340 communicate via a communication bus 350.

The area analyzer 310 in the illustrated example of FIG. 3 analyzes information/data received from the printer 110 and/or the print manager 140 of FIGS. 1 and/or 2. The example area analyzer 310 of FIG. 3 receives and/or analyzes at least one dimension (e.g., a width of a paper roll, a width and/or length of a paper sheet, etc.) of a print area for a print medium identified/analyzed by the print manager 140 of FIGS. 1 and/or 4. The area analyzer 310 serves as an interface between the printer 110 and/or the print manager 140. For example, the area analyzer 310 receives dimension information (data) for a print surface of a print medium (e.g., print dimensions of the printer 110). In some examples, the area analyzer 310 provides dimension data corresponding to the printer 110 and/or printer manager 140 of FIGS. 1 and/or 2 to the roll selector 330. In some examples, the area analyzer 310 determines a print area of the print medium on a designated roll of the printer 110.

In the illustrated example of FIG. 3, the content analyzer 320 identifies and/or analyzes data/information (e.g., width information, length information, etc.) for content that is designated to be printed (e.g., by the printer 110). For example, the content analyzer 320 identifies/determines graphical content prepared on the electronic device 120, via the electronic device 120, and/or by the electronic device 120, The content analyzer 320 may determine a content box corresponding to a perimeter and/or area of the content that is to be printed. Accordingly, the content analyzer 320 identifies printing dimensions of the content from the electronic device 120 that is to be printed by the printer 110 of FIG. 1.

The example roll selector 330 of FIG. 3 analyzes the dimension information analyzed by the area analyzer 310 and/or the content analyzer 320 to select a roll (e.g., a paper roll) and/or tray of the printer 110 to supply the print medium for printing the content. For example, the roll selector 330 may compare print area(s) for corresponding roll(s)/tray(s) determined by the area analyzer 310 and a content box determined by the content analyzer 320. Based on the compared dimensions/areas, the roll selector 330 may select which roll/tray the printer 110 is to use to print the content. In some examples, the roll selector 330 selects a roll/tray based on a least amount of content that is to be clipped if the content is printed on the print medium of the corresponding roll/tray. In some examples, the roll selector 330 selects a roll/tray based on a least amount of area of the print medium to which the content would not be printed (e.g., to minimize wasted materials). Additionally or alternatively, the roll selector 330 may rank rolls/trays of the printer 110 for printing content based on the analyzed print areas of the print medium of the rolls/trays and a content box, as disclosed herein. Accordingly, using the dimensions from print manager 140/area analyzer 10, the roll selector 330 may predict a most appropriate roll/tray for printing content on a corresponding print medium.

The print previewer 340 in the illustrated example of FIG. 3 renders and/or presents a graphical representation of content (or a content box) that is to be printed using print media from a corresponding roll/tray of the printer 110. In some examples, the content previewer 340 graphically displays areas of a content box that include content that is to be clipped if printed on a print medium of a roll/tray, in some examples, the content previewer 340 presents the content box relative to a print area of a print medium for a roll/tray selected by the roll selector 330. In some examples, the content previewer 340 present the content box over multiple print areas corresponding to the print mediums of the rolls/trays to enable a user to visually identify any content that is to be clipped on using the corresponding rolls/trays. In such examples, the print previewer 340 may overlap the previewed print areas of the corresponding rolls/trays. Accordingly, a user may preview an amount of content (if any) that is to be clipped if the content is printed on print medium from a corresponding roll/tray of the printer 110.

While an example manner of implementing the printer analyzer 150 FIG. 1 is illustrated in FIG. 3, at least one of the elements, processes and/or devices illustrated in FIG. 3 may be combined, divided, re-arranged, omitted, eliminated and/or implemented in any other way. Further, the area analyzer 310, the content analyzer 320, the roll selector 330, the content previewer 340, and/or, more generally, the example printer analyzer 150 of FIG. B may be implemented by hardware, software, firmware and/or any combination of hardware, software and/or firmware. Thus, for example, any of the area analyzer 310, the content analyzer 320, the roll selector 330, the content previewer 340, and/or, more generally, the example printer analyzer 150 could be implemented by at least one of an analog or digital circuit, logic circuit, programmable processors, application specific integrated circuits (ASIC), programmable logic device (PLO) and/or field programmable logic device (FPLD). When reading any of the apparatus or system claims of this patent to cover a purely software and/or firmware implementation, at least one of the area analyzer 310, the content analyzer 320, the roll selector 330, and/or the content previewer 340 is/are hereby expressly defined to include a tangible computer readable storage device or storage disk such as a memory, a digital versatile disk (DVD), a compact disk (CD), a Blu-ray disk, etc. storing the software and/or firmware. Further still, the example printer analyzer 150 of FIG. B may include at least one element, process and/or device in addition to, or instead of, those illustrated in FIG. 4, and/or may include more than one of any or all of the illustrated elements, processes and devices.

Figure 4:
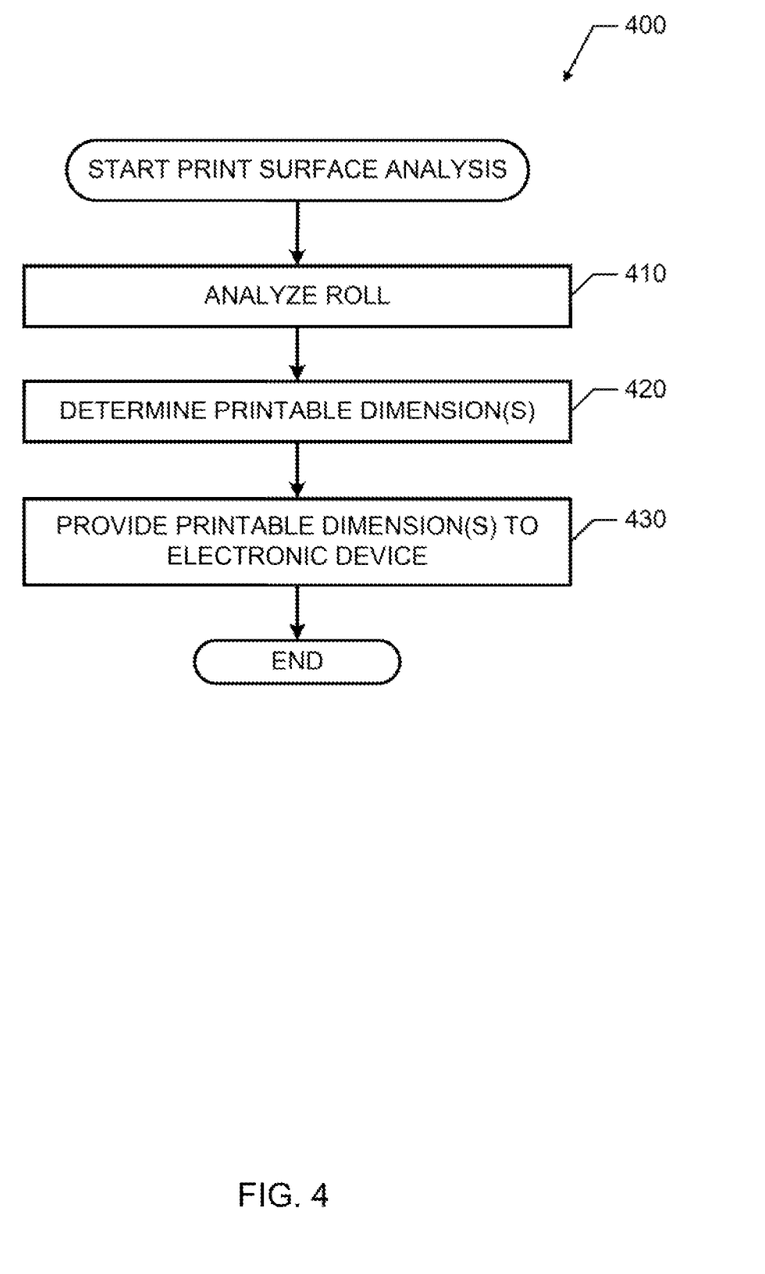
FIG. 4 is a flowchart representative of example machine readable instructions that may be executed to implement the print manager of FIGS. 1 and/or 2.

A flowchart representative of example machine readable instructions for implementing the print manager 140 of FIGS. 1 and/or 2 is shown in FIG. 4. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 4, many other methods of implementing the example print manager 140 may alternatively be used. For example, the order of execution of the blocks may be changed, and/or some of the blocks described may be changed, eliminated, or combined.

The example program 400 of FIG. 4 begins with an initiation of the print manager 140 (e.g., upon powering on the printer 110, upon installation on the printer 110, upon connection with the electronic device 120, upon insertion of a print medium, etc.). The example program 400 may be iteratively executed to analyze and/or manage characteristics of the printer 110. For example, the program 400 may be executed to analyze each roll/tray of the printer 110. At block 410, the roll manager 210 analyzes roll(s) of the printer 110. In some examples, the roll manager 210 identifies the roll(s) of the printer 110 using sensors that determine an addition or a removal of a roll and/or tray from the printer 110. The example roll manager 210 of FIG. 2 analyzes the rolls at block 410 using a paper detector 212 and/or location manager 214 as disclosed herein. Accordingly, at block 410, the roll manager 210 identifies a print medium on the analyzed roll and at least one dimension of the print medium.

At block 420, the dimension analyzer 220 determines print dimensions of the print medium on the analyzed roll. For example, at block 420, the dimension analyzer 420 may determine a width, length, thickness, etc. of the print medium on the roll. In some examples, the dimension analyzer 220 analyzes the print medium and determines the print dimensions of the print medium based on the substance and/or type of print medium. At block 430, the dimension provider 230 provides the print dimension(s) to an electronic device (e.g., the electronic device 120 of FIG. 1). After block 430, the program 400 ends. In some examples, after block 430, the print manager 140 determines whether the program 400 is to be executed again to analyze additional roll(s)/tray(s) of the printer 110.

Figure 5:
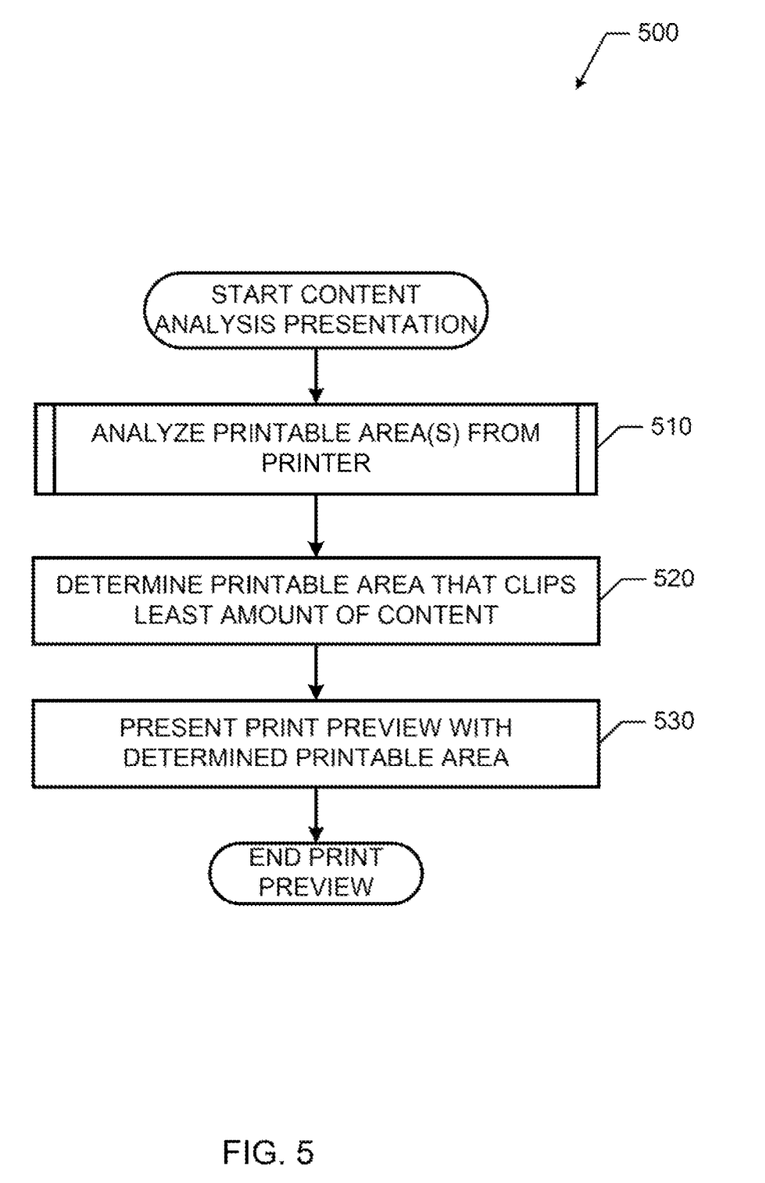
FIG. 5 is a flowchart representative of example machine readable instructions that may be executed to implement the printer analyzer of FIGS. 1 and/or 3.

Flowcharts representative of example machine readable instructions for implementing the printer analyzer 150 of FIGS. 1 and/or 3 are shown in FIGS. 5 and/or 6. In this example, the machine readable instructions comprise program(s) for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 5 and/or 6, many other methods of implementing the example printer analyzer 150 may alternatively be used. For example, the order of execution of the blocks may be changed, and/or some of the blocks described may be changed, eliminated, or combined.

Figure 6:
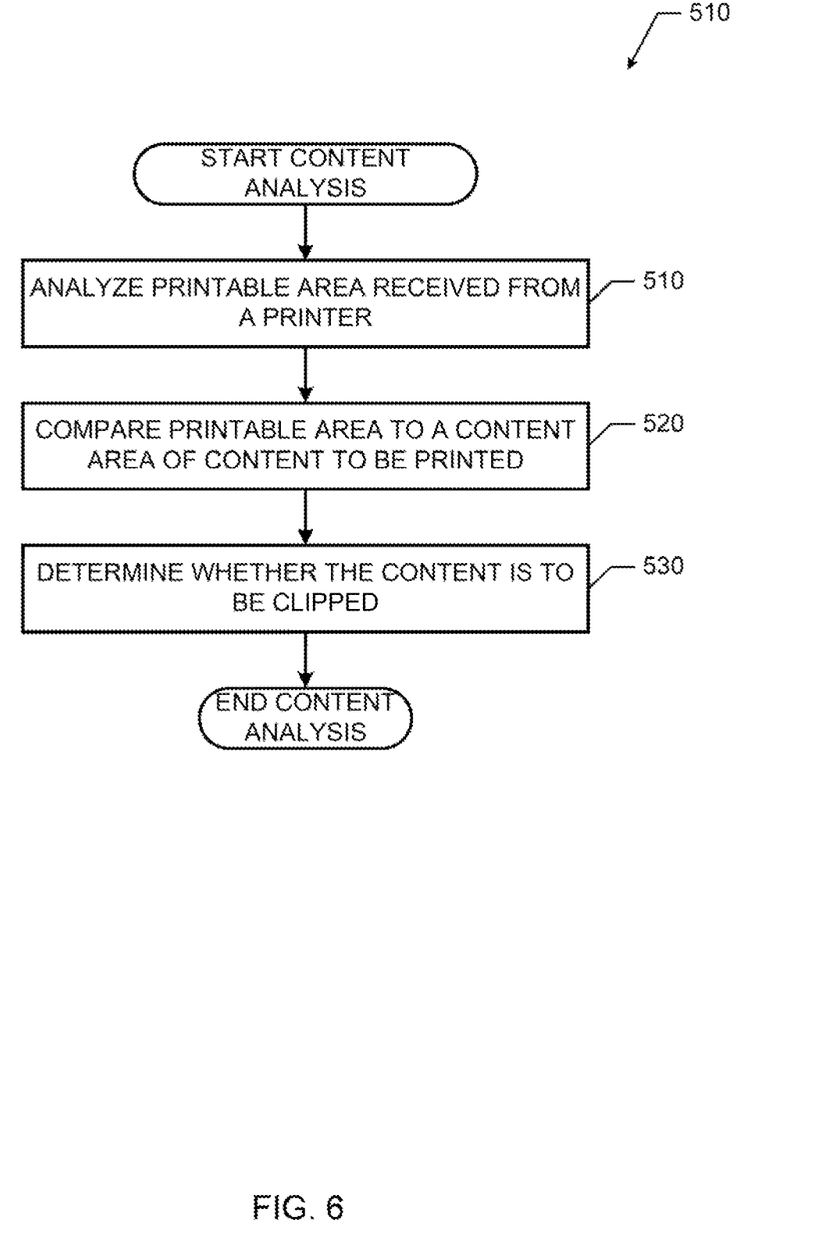
FIG. 6 is a flowchart representative of other example machine readable instructions that may be executed to implement the printer analyzer of FIGS. 1 and/or 3.

The program 500 of FIG. 5 begins with an initiation of the printer analyzer 150 of FIGS. 1 and/or 3 (e.g., upon powering on the electronic device 120, upon installation on the electronic device 120, upon connection with the printer 110, upon receiving content, etc.). At block 510, the printer analyzer 150 analyzes print area(s) of print medium(s) based on print dimension(s) received from a printer. FIG. 6 illustrates a detailed example of block 510 that may be executed to implement the printer analyzer 150 to analyze the print areas.

At block 520 of FIG. 5, the roll selector 330 determines which print area is to clip a least amount of content. For example, the roll selector 330 compares an amount of content to be clipped using respective roll(s)/tray(s) corresponding to the print areas based on analysis of the area analyzer 310 and the content analyzer 320 of FIG. 3. At block 530, content previewer 340 presents a print preview of the content to be printed and the determined print area. For example, the print previewer 340 may render a display indicating which portions of the content are to be clipped due to the characteristics of the corresponding roll/tray and/or print medium that defined the print area. After block 530, the program 500 ends.

FIG. 6 illustrates example machine readable instructions that may be executed to implement the instructions of block 510 of FIG. 5. The program 510 of FIG. 6 begins with an initiation of the printer analyzer 150 of FIGS. 1 and/or 3. At block 610 of FIG. 6, the printer analyzer 150 receives print dimension(s) from a printer in communication with the electronic device (e.g., the printer 110 of FIG. 1). At block 620 of FIG. 6, the roll selector 330 compares the print area to a content area (e.g., a content box) of content to be printed. For example, at block 620, the roll selector 330 receives a content box (e.g., based on a perimeter of content and/or a determined area of the content) from the content analyzer 320 of FIG. 2.

At block 630 of FIG. 6, the roll selector 330 determines whether content is to be clipped using a print medium associated with the print area of block 610. For example, at block 630, if the content area has a dimension larger than the print area, the roll selector 330 may determine that the content is to be clipped if printed on the print medium. After block 630, the program 510 ends. In some examples, after block 630, if the example roll selector 330 determines that content is to be clipped, the printer analyzer 150 may execute the program 510 of FIG. 6 again to analyze another print area corresponding to a different roll/tray (and/or a different print medium) of the printer 110.

As mentioned above, the example processes of FIGS. 4, 5, and/or 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4, 5, and/or 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 7:
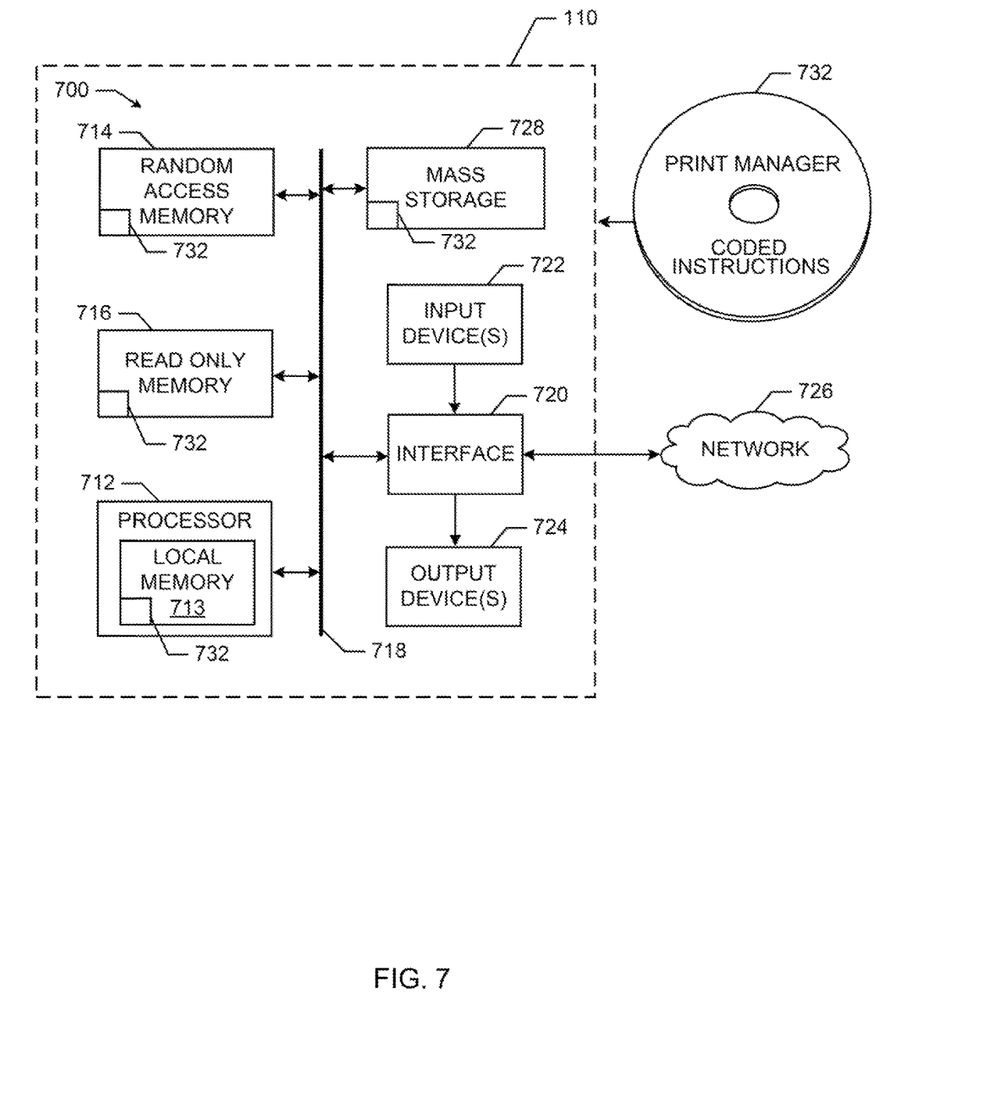
FIG. 7 is a block diagram of a processor platform capable of executing the instructions of FIG. 4 to implement the print manager of FIGS. 1 and/or 2 and/or to implement the printer analyzer of FIGS. 1 and/or 3.

FIG. 7 is a block diagram of an example processor platform 700 of the printer 110 of FIG. 1 capable of executing the instructions of FIG. 4 to implement the print manager 140 of FIG. 2. The processor platform 700 of the illustrated example of FIG. 7 includes a processor 712. The processor 712 of the illustrated example is hardware. For example, the processor 712 can be implemented by at least one integrated circuit, logic circuit, microprocessor or controller from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 may be controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, at least one input device 722 is connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, ISO-point and/or a voice recognition system.

At least one output device 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes at least one mass storage device 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIG. 4 may be stored in the mass storage device 728, in the local memory 713 in the volatile memory 714, in the non-volatile memory 716, and/or on a removable tangible computer readable storage medium such as a CD or DVD.

Figure 8:
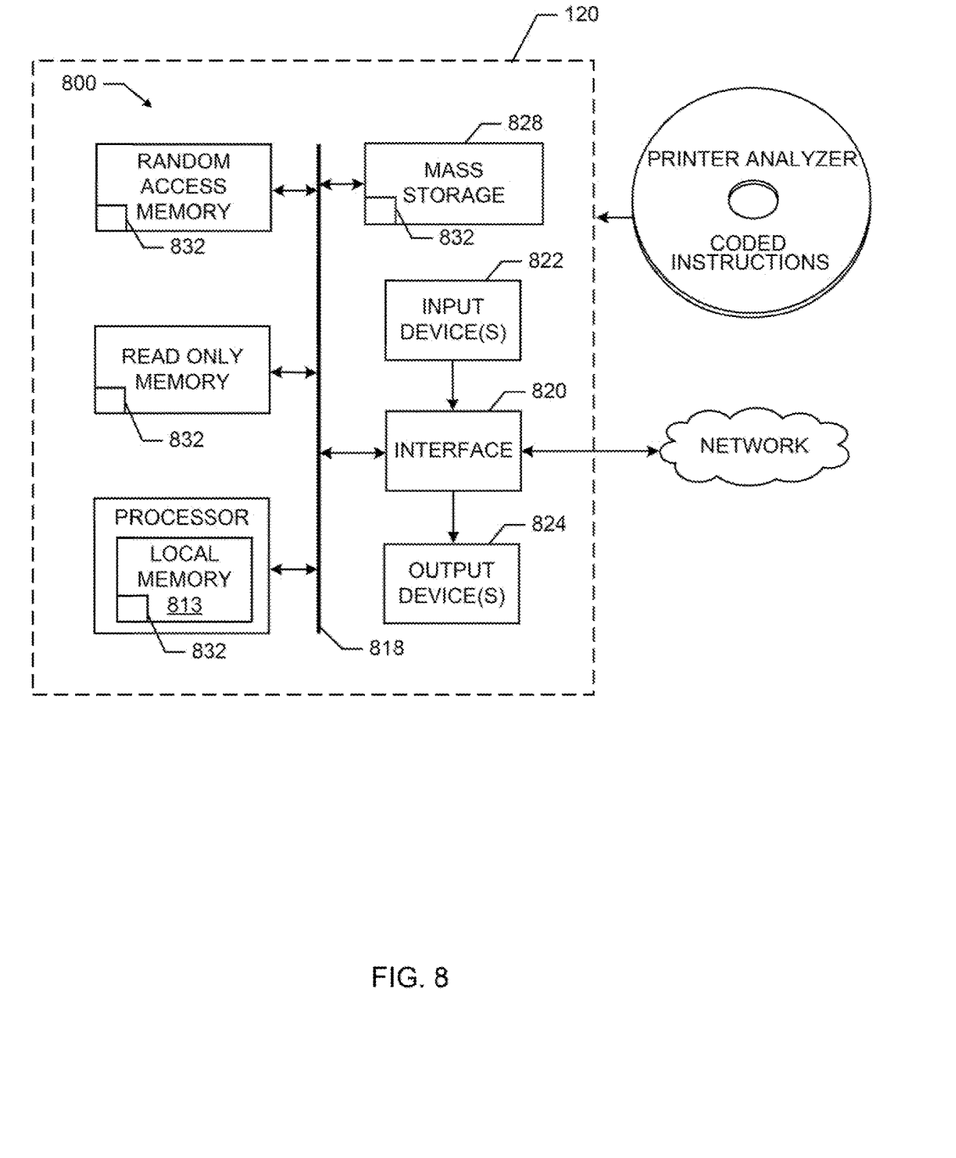
FIG. 8 is a block diagram of a processor platform capable of executing the instructions of FIGS. 5 and/or 6 to implement the printer analyzer of FIGS. 1 and/or 3.

FIG. 8 is a block diagram of an example processor platform 800 of the electronic device 120 of FIG. 1, capable of executing the instructions of FIG. 4 to implement the print manager 150 of FIG. 2. The electronic device 120 of FIG. 8 can be, for example, a server, a personal computer, a mobile device (e.g., a cell phone, a smart phone, a tablet such as an iPad™), a personal digital assistant (PDA), an Internet appliance, a gaming console, a set top box, or any other type of computing device.

The processor platform 800 of the illustrated example of FIG. 8 includes a processor 812. The processor 812 of the illustrated example is hardware. For example, the processor 812 can be implemented by at least one integrated circuit, logic circuit, microprocessor or controller from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, at least one input device 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

At least one output device 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes at least one mass storage device 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 5 and/or 6 may be stored in the mass storage device 828, in the local memory 813 in the volatile memory 814, in the non-volatile memory 816, and/or on a removable tangible computer readable storage medium such as a CD or DVD.

From the foregoing, it will be appreciated that the above disclosed methods, apparatus and articles of manufacture enable a printer to provide specific details and/or characteristics of the printer to an electronic device. Examples disclosed herein enable an electronic device to automatically identify and/or select an appropriate roll/tray for supplying print media for printing based on the information received from the printer, rather than using fixed information controlled by printer drivers on the electronic device. Accordingly, the examples disclosed herein provide more accurate printing details based on the specific capabilities of the printer and/or the type of print medium loaded in the printer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
receiving data from a sensor of a printer, the data being related to a first roll of the printer;
analyzing the first roll of the printer, the first roll holding first paper having a first width;
determining, via a processor of the printer, a first print dimension of the first paper on the first roll based on the first width;
providing the first print dimension to an electronic device, the electronic device to use the first print dimension to determine whether content is to be clipped when printed on the first paper;
receiving instructions from the electronic device, the instructions being based on the determination by the electronic device of whether the content is to be clipped, the determination by the electronic device being based on the first print dimension received from the printer; and
printing the content based on the instructions received from the electronic device.

2. The method as defined in claim 1, further comprising:
identifying a location of the first paper on the first roll; and
determining the first print dimension based on the location of the first paper on the first roll.

3. The method as defined in claim 1, further comprising:
determining, via the processor of the printer, non-print margins of the first paper based on at least one of the first width and a location of the first paper on the first roll; and
providing the non-print margins to the electronic device.

4. The method as defined in claim 1, further comprising:
in response to receiving instructions from the electronic device, adjusting a location of the first paper on the first roll to reduce an amount of the content that is to be clipped.

5. The method as defined in claim 1, further comprising:
determining that second paper is located on a second roll of the printer, the second paper having a second width; and
in response to receiving instructions from the electronic device, printing the content on the second paper to reduce an amount of the content that is to be clipped relative to printing on the first paper.

6. The method as defined in claim 1, further comprising:
identifying a second roll of the printer;
determining that second paper is loaded on the second roll, the second paper having a second width;
determining, via the processor, a second print dimension of the second paper based on the second width; and
providing the first print dimension and the second print dimension to the electronic device, the electronic device to select the first roll or the second roll to supply the first paper or the second paper, respectively, to a print head to print the content, the electronic device to select the first roll or the second roll based on a first percentage of content that is to be clipped when the content is to be printed on the first paper or a second percentage of the content that is to be clipped when the content is to be printed on the second paper, respectively.

7. A printer comprising:
a roll manager to identify first paper on a first roll and a first width of the first paper, the roll manager being to receive data from a sensor, the data being associated with the first roll;
a dimension analyzer to determine a print dimension for printing content on the first paper based on the first width;
a dimension provider including an interface couplable to an electronic device to provide the first print dimension of the first paper to the electronic device and to receive instructions from the electronic device to print content, the instructions being based at least in part on the first print dimension provided to the electronic device and a determination by the electronic device of whether the content is to be clipped, the determination being based on the first print dimension.

8. The printer as defined in claim 7, wherein the dimension analyzer is further to determine a print area of the first paper based non-print margins, the non-print margins created based on the first width and a location of the first paper on the first roll, the print area to be used by the electronic device to determine whether content to be printed by the printer is to be clipped.

9. The printer as defined in claim 7, further comprising:
a second roll loaded with second paper having a second width different from the first width,
wherein the dimension analyzer is to determine a second print dimension of the second paper based on the second width, and the dimension provider is to provide the second print dimension to the electronic device.

10. The printer as defined in claim 7, wherein the dimension analyzer is further to determine a print area based on the first dimension and a location of the first paper on the first roll.

11. The printer as defined in claim 7, wherein the roll manager is to adjust a location of the first paper on the first roller in response to instructions from the electronic device.

12. A non-transitory computer readable storage medium comprising instructions that, when executed, cause an electronic device to:
analyze a print area of a first paper on a first roll of a printer, the print area received from the printer based on a sensor of the printer, wherein the printer is coupled to the electronic device via an electronic communication link;
compare the print area to a content area, the content area determined based on content to be printed on the first paper by the printer;
determine whether a first portion of the content is to be clipped when printed on the first paper based on the compared print area and the content area; and
transmit instructions to the printer, the instructions being based on the determination of whether the first portion of the content is to be clipped, the determination being based on the print area received from the printer.

13. The non-transitory computer readable storage medium of claim 12, wherein the instructions, when executed, further cause the electronic device to:
present the print area and the content on a display; and
when the first portion of the content is to be clipped, indicate on the display the first portion of the content that is to be clipped.

14. The non-transitory computer readable storage medium of claim 12, wherein the instructions, when executed, further cause the electronic device to:
when the first portion of the content is to be clipped, analyze a second print area of second paper on a second roll of the printer, the second print area received from the printer;
compare the second print area to the content area; and
determine whether a second portion of the content that is to be clipped when printed on the second paper based on the compared second print area and the content area; and
instruct the printer to print the content on the second paper when a first area of the first portion is less than a second area of the second portion.

15. The non-transitory computer readable storage medium of claim 12, wherein the instructions, when executed, further cause the electronic device to:
when the first portion of the content is to be clipped, prompt a user to indicate that the content is to be clipped; and
present on a display alternative settings for the printer to print the content on the first paper of the printer, the alternative settings based on adjusting a location of the first paper on the first roll.

* * * * *

UNITED STATES PATENT AND TRADEMARK OFFICE
CERTIFICATE OF CORRECTION

PATENT NO. : 10,075,610 B2
APPLICATION NO. : 15/306700
DATED : September 11, 2018
INVENTOR(S) : Francisco Javier Viella Fernandez et al.

Page 1 of 1

It is certified that error appears in the above-identified patent and that said Letters Patent is hereby corrected as shown below:

On the Title Page

In Column 1, item (72), Inventors, Line 2, delete "San Cugat del Valles" and insert -- Sant Cugat del Valles --, therefor.

Signed and Sealed this
Second Day of July, 2019

Andrei Iancu
*Director of the United States Patent and Trademark Office*